United States Patent [19]

Takigawa et al.

[11] 4,214,618
[45] Jul. 29, 1980

[54] HEAVY DUTY PNEUMATIC RADIAL TIRE

[75] Inventors: Hiroyoshi Takigawa; Hiroshi Ogawa; Shinichiro Ohkuni, all of Kodaira; Mitsuhisa Yahagi, Sayama, all of Japan

[73] Assignee: Bridgestone Tire Company Limited, Kyobashi, Japan

[21] Appl. No.: 896,424

[22] Filed: Apr. 14, 1978

[30] Foreign Application Priority Data

Apr. 26, 1977 [JP] Japan .................................. 52-48216

[51] Int. Cl.$^2$ ............................................. B60D 11/04
[52] U.S. Cl. ............................... 152/209 D; D12/142
[58] Field of Search ........................ 152/209 D, 209 R; D12/142, 143

[56] References Cited

U.S. PATENT DOCUMENTS

| | | | |
|---|---|---|---|
| 3,698,462 | 10/1972 | Jacobs | 152/209 R |
| 3,782,438 | 1/1974 | Mirtain | 152/209 R |
| 3,897,813 | 8/1975 | Verdier | 152/209 R |

Primary Examiner—Richard A. Bertsch
Attorney, Agent, or Firm—Sughrue, Rothwell, Mion, Zinn and Macpeak

[57] ABSTRACT

A heavy duty pneumatic radial tire comprises a tread continuous at its round-shaped shoulders with sidewalls and formed with a plurality of main tread grooves extending circumferentially thereof. The tread is formed with a circumferentially extending narrow groove in zigzag in each end zone of contact surfaces of the shoulders with a road surface under a standard load. The zigzag grooves have a width of 15–30% of that of the main tread grooves, an amplitude of 0.5–2.0% of the tread width and a pitch of 2.0–7.0% of the tread width. Each of the shoulders is formed in its side surface with a series of intermittent circumferential caved portions, such that a distance in an axial direction of the tire between the deepest bottoms of the caved portions is 105–110% of the tread width and the deepest bottoms are located in a circle having a diameter less than that of a circle passing through the bottoms of the main tread grooves. With the arrangement, the tire according to the invention does not cause any irregular wear at the shoulders and can reduce and prevent the railway wear and growth thereof toward the center of the tread, so that the wear-resistance of the tire is remarkably improved.

6 Claims, 10 Drawing Figures

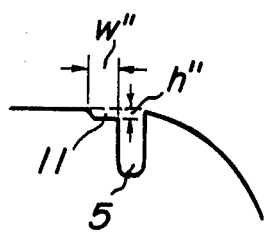
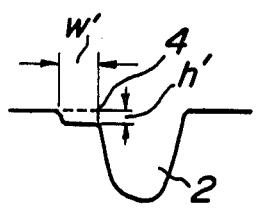
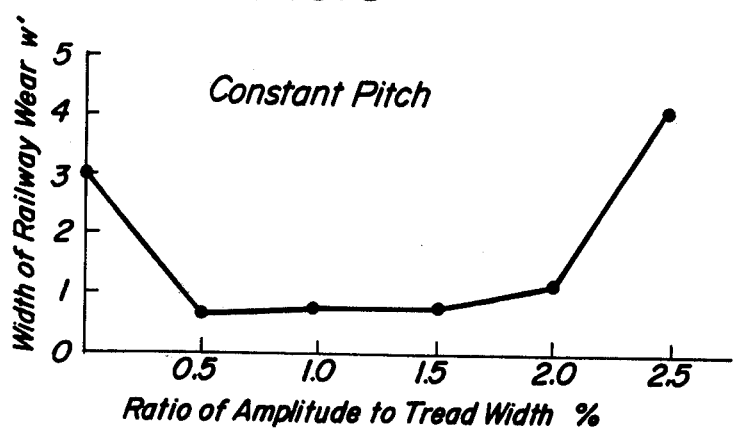
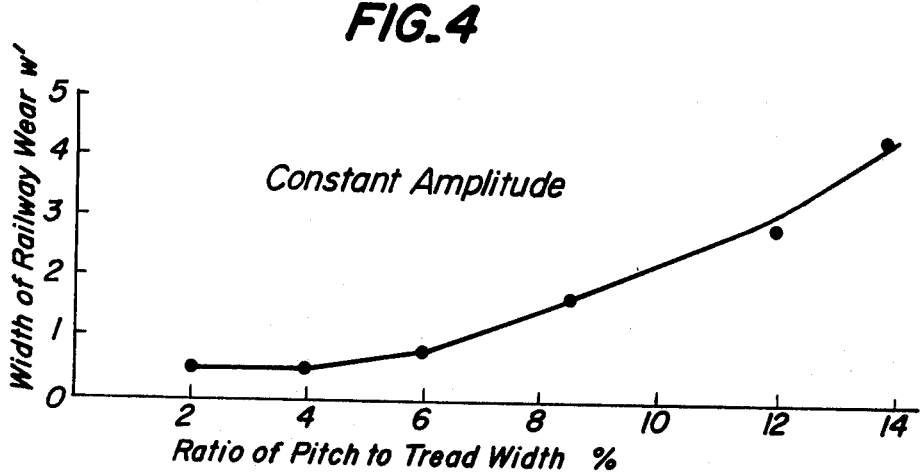

HEAVY DUTY PNEUMATIC RADIAL TIRE

BACKGROUND OF THE INVENTION (1) Field of the Invention

The present invention relates to a heavy duty pneumatic radial tire having an improved wear-resistant property, and more particularly to a heavy duty pneumatic radial tire adapted to prevent the extraordinary or irregular wear which often tends to occur at shoulders of the tires of this kind after continuously travel for long distances.

(2) Description of the Prior Art

In general, radial tires having at least two metal cord layers as a reinforcement for a belt are superior in wear-resistance and puncture-proof because between treads and carcass plies are arranged belts particularly tougher than in conventional bias tire. However, the radial tires are somewhat inferior in comfortability to ride due to the reinforcement by the belts. Accordingly, the radial tires which are also suitable for bad roads have been generally developed for good roads and have been recently widely used with the remarkable improvement of the road situation such as the extension and completion of super-highways.

On the other hand, however developed the roads or highways may be, they cannot completely avoid unevennesses such as seams of pavements or differences in level or partially unpaved roads. When radial tires of this kind are used for front wheels, they may be poor in stability of straight travelling owing to a tendency for a handle to be driven from the wheels running on the seams, stepped portions or tracks formed in the bad rods. Since this disadvantage results from the sufficient reinforcement of the entire tread by the belts, the round shoulders of tires wherein the shoulders are formed in a rounded-shape have been developed in order to avoid the disadvantage.

However, it has been found by experiments on such heavy duty radial tires having round shoulders that irregular wears having a depth and a width occur in the ends of contact surfaces of the treads which are apt to grow progressively toward the center of the tread and often cause the wear-resistance of the tire to be reduced. The irregular wear may be caused by the slip of shoulder portions due to the difference in rolling diameter thereof.

SUMMARY OF THE INVENTION

The object of the present invention is to provide an improved heavy duty pneumatic radial tire having the round shoulders which has novel configuration and tread pattern to prevent the irregular wear at the shoulders to improve the wear-resistant property of the tire.

The inventors of the present invention have tried to prevent the irregular wear by providing circumferential narrow grooves in the ends of the contact area of the shoulders with the road. With this arrangement, however, the inventors have encountered an undesirable phenomenon that wears occur in an early stage in edges of shoulder ribs facing to the circumferentially continuous narrow zigzag grooves to form a stepped portion which is so-called "railway wear". In other words, irregular wears locally occur in the proximity of angular protrusions of the shoulder ribs extending into the circumferentially continuous narrow zigzag grooves and grow progressively with increasing travelling distance to merges into adjacent irregular wears to form a circumferentially continuous wear pattern.

As a result of various experiments on tires having round shoulders, the inventors have found the following two facts.

(1) The occurrence of the railway wear in the shoulder ribs depends greatly upon the configuration of the circumferentially continuous narrow zigzag grooves in the shoulders.

(2) The growth of the irregular wears in the shoulder ribs toward the center of the tread depends mainly upon the location of the grooves in the shoulders and the configuration of the shoulders.

The inventors have further investigated in consideration of the facts and found essential features of a tire to solve the above problems effectively.

The heavy duty pneumatic radial tire includes a tread smoothly continuous at its round-shaped shoulders with sidewalls and formed in its substantially central circumferential surface with a plurality of main tread grooves extending circumferentially thereof. The tread being reinforced by a belt consisting of at least two metal cord layers arranged about carcass piles and between said tread and carcass plies, and comprises, in an end zone of contact surfaces of said shoulders with a road surface under a standard load, a circumferentially extending narrow groove in zigzag having a width of 15–30% of that of said main tread grooves. The amplitude of the zigzag of 0.5–2.0% is a tread with corresponding to a distance between ends of said contact surfaces and a pitch of said zigzag is 2.0–7.0% of the tread width.

In another aspect, the tire according to the invention includes a tread smoothly continuous at its round-shaped shoulders with sidewalls and formed in its substantially central circumferential surface with a plurality of main tread grooves extending circumferentially thereof. The tread is reinforced by a belt consisting of at least two metal cord layers arranged about carcass plies and between said tread and carcass plies, and comprises, in an end zone of a contact surface of each said shoulder with a road surface under a standard load, circumferentially extending narrow grooves in zigzag having a width of 15–30% of a width of said main tread grooves. The amplitude of said zigzag is 0.5–2.0% of a tread width corresponding to a distance between ends of said contact surfaces and a pitch of said zigzag is 2.0–7.0% of said tread width. It further comprising a series of intermittent caved portions circumferentially formed in a side surface of each said shoulder, a distance in an axial direction of the tire between the deepest bottoms of the caved portions being 105–110% of said tread width. The deepest bottoms are located in a circle having a diameter less than that of a circle passing through bottoms of said main tread grooves.

The term "under a standard load" used herein means a loaded condition under which a standard load is applied to a tire with a standard rim with a standard inner pressure. Under such a condition, the contact width of a tread with a road surface is longer than that under no-load condition resulting from the deformation of the tire. The contact width of the tread under the standard load is the tread width of the tire.

In order that the invention may be more clearly understood, preferred embodiments will now be described, by way of example, with reference to the accompanying drawings.

BRIEF DESCRIPTION OF THE DRAWINGS

FIG. 1b is a partial sectional view of the tire as shown in FIG. 1a;

FIGS. 2a and 2b are sectional view illustrating railway wears of tires;

FIG. 3 is a graph showing a relation between the railway wear and the ratio of amplitude of zigzag of narrow grooves to tread width;

FIG. 4 is a graph showing a relation between the railway wear and the ratio of pitch of zigzag of narrow grooves to tread width;

DETAILED DESCRIPTION OF THE PREFERRED EMBODIMENT

Figure 1A:
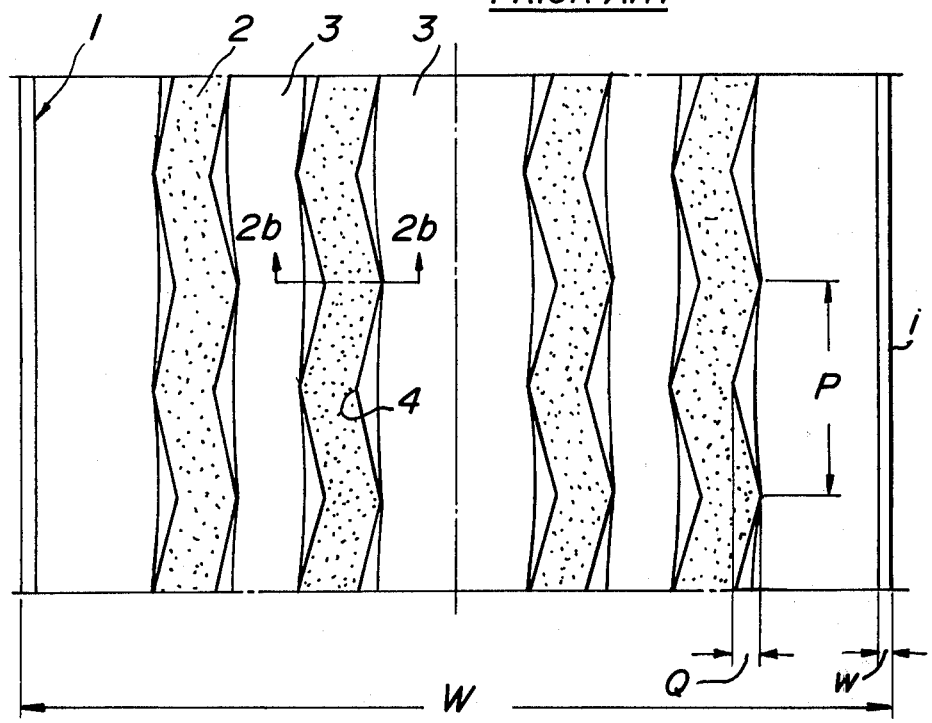
FIG. 1a is a partial plan view of a tread pattern of a tire of the prior art.
Figure 1B:
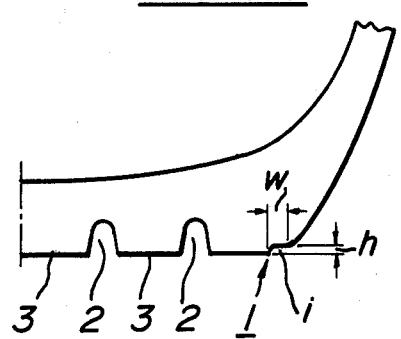

FIGS. 1a and 1b illustrate a pattern of a tire of the prior art, which comprises, in a tread between shoulders 1, main tread grooves 2 and circumferential ribs 3 having angular protrusions 4 extending into the main tread grooves 2. With a heavy duty radial tire having rounded shoulders, irregular wear often occurs in the ends of contact surfaces of the tread having a depth h and a width w which are apt to grow progressively toward the center of the tread. FIG. 2a is a diagramatical sectional view showing a railway wear when narrow grooves 5 extending circumferentially in zigzag in the shoulder 1 are provided in the same manner as the main tread grooves in a round shoulder type heavy duty pneumatic radial tire as shown in FIGS. 1a and 1b. The wear occurs locally in an area in the proximity of the protrusion 11 of the circumferential rib extending into the narrow groove 5 in an axial direction of the tire (a direction of the width of the tread). Such a wear pattern grows progressively as its travelling distance increases and it merges finally into a wear in an adjacent area to form a continuous worn portion in the shoulder. FIG. 2b illustrates railway wear which has a depth h' and a width w' in the proximity of the angular protrusion 4 of the rib 3 facing to the main tread groove 2 which is circumferentially continuous in zigzag in a tread of the prior art as shown in FIG. 1a. This railway wear is similar to the wear illustrated by i in FIG. 1a which is ultimately continuous circumferentially of the tire.

The inventors of the present invention have made various experiments on these wear patterns in the main tread grooves as shown in FIG. 1 based on the opinion in that the railway wears at the zigzag grooves are substantially the same irrespective of the locations of the grooves, if they are provided in shoulders or the center of a tread.

As above described, the angular protrusions 4 of the circumferential ribs 3 extending into the main tread grooves 2 tend to cause the railway wear. The inventors have investigated the patterns of this kind to prevent the railway wear and found that such patterns are greatly influenced by the configuration of the zigzag, such as amplitudes Q and pitches P. FIG. 3 is a graph showing the relation between the railway wear and the ratio of the amplitude of the tread width.

The degree of the railway wear is generally indicated by the depth or difference in level h' and the width w' of the wear at the angular protrusion 4 of the circumferential ribs 3 extending into the main tread groove 2 as shown in FIG. 2b. The width w' of the wear generally increases correspondingly with the depth h', so that the width w' is representatively used as an indication for wearing. The inventors have systematically made experiments on tires of 10.00R 20 having belts each consisting of two metal cord layers and carcass plies of radially arranged cords. With various ratios of amplitudes to tread widths and with a constant pitch of the zigzags, the results are shown in FIG. 3, the ratios of the amplitude to the tread width of 0.5–2.0% are preferable and 0.55–1.7% are more preferable to prevent the railway wear to the minimum. The ratios in excess of 2.0% considerably increase the railway wear. The ratios less than 0.5% encounter a difficulty in manufacture of tires. In an extreme case, when the main tread grooves are rectilinear, the railway wear again increases. With experiments of the grooves with a constant pitch and various ratios of pitch to tread width, it has been found that the ratios of 2.0–7.0% are optimum and 3.6–6.0% are more preferable. Grooves with less than 2.0% ratio of pitch to tread width are difficult to manufacture. Grooves with more than 7% ratio increase the railway wear.

The inventors have found in this manner the configurations of the circumferential grooves which are effective to prevent the railway wear. The inventors have further investigated how to prevent the occurrence of the railway wear in the round shoulders and the growth thereof toward the center of the tread and as the result, they have found to be effective circumferentially continuous narrow grooves 5 in zigzag having widths somewhat less than those of the main tread grooves 10 with amplitudes and pitches above described and preferably arranged in symmetry.

Figure 5:
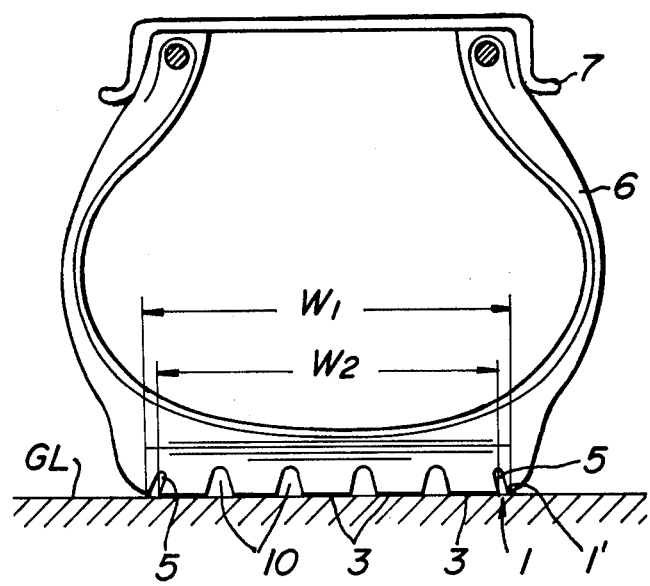
FIG. 5 is a diagrammatical sectional view of one embodiment of the tire according to the invention.

FIG. 5 illustrates a section of a tire 6 according to the invention in contact with a road surface GL and having a standard rim 7. The width of the narrow grooves 5 should be 15–30% of the width of the main tread grooves 10 for the reason explained hereinafter. The center-to-center distance $W_2$ of the narrow grooves 5 is preferably 90–105% of the tread width $W_1$ which is the contact width of the tread with the road surface when the tire 6 is loaded by the standard load with the standard inner pressure. The shoulder rib 1' divided by the narrow groove 5 from the circumferential rib 3 tends to incline toward the narrow groove 5 in cornering of the tire to reinforce or back up the circumferential rib 3 to reduce the railway wear. When the center-to-center distance $W_2$ of the narrow grooves 5 is too short or too long, the effect of the grooves 5 for prevention of the growth of the railway wear to the tread center is reduced. The narrow grooves 5 having widths less than 15% of the width of the main tread grooves are extremely inconvenient in manufacture, while the narrow grooves 5 having widths more than 30% permit the shoulder ribs to move to a locally greater extent causing another irregular wear. Accordingly, the width of the narrow grooves 5 should be 15–30% of the width of the main tread grooves 10 as above described.

Moreover, it has been found that the depth of the narrow grooves 5 should be at least 60% of the depth of the main tread grooves 10 for the purpose of decreasing the rigidity of the shoulder required to reduce the railway wear and narrow grooves 5 having depths less than 60% of those of the main tread grooves do not serve to reduce the railway wear.

Figure 6:
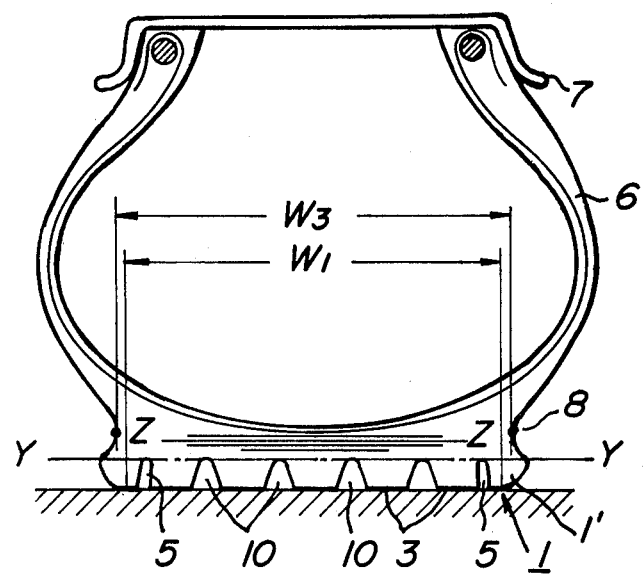
FIG. 6 is a diagrammatical sectional view of another embodiment of the tire according to the invention.

The object of the invention can be accomplished in the manner above described. It has been found that caved portions 8 provided in the shoulders are preferably to reduce entirely the rigidity of the shoulder ribs 1' in order to more improve the prevention of the railway wear by the circumferential ribs 3 and shoulder ribs 1' embracing the narrow grooves 5 as shown in FIG. 6.

The bottom Z of the caved portion 8 which is deepest as viewed in the axial direction of the tire is radially inside of the intersection of the outline of the shoulder and the line Y—Y passing through the bottoms of the main tread grooves 10. The distance $W_3$ in the axial direction of the tire between the deepest bottoms of the caved portions 8 on both sides of the tire should be 105–110% of the tread width $W_1$. Furthermore, it has been found that a total length n·l which is a sum of the circumferential lengths l of the caved portions 8 is preferably at least 80% of the circumferential length L at the circumferential location.

If the deepest bottoms Z of the caved portions are not inside of the line Y—Y, there is a risk of the shoulder ribs 1' to be worn off. The caved portions do not serve to reduce the wear, when the distance $W_3$ between the deepest bottoms of the caved portions is more than 110% of the tread width, while they may cause other problems such as an irregular wear and low wear-resistance as a whole when the distance $W_3$ is less than 105% of the tread width.

Figure 8:
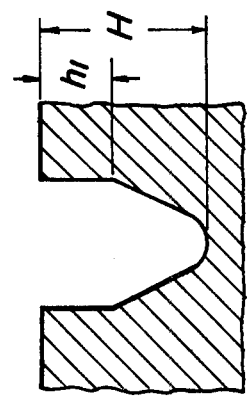
FIG. 8 is a partial sectional view of the tire showing a preferred embodiment of the main tread groove formed in the tire according to the invention.

It is also of course preferable for the main tread grooves 10 to have amplitudes and pitches similar to those of the narrow groove 5 in order to reduce the railway wear. As shown in FIG. 8, sidewalls of the main tread grooves 10 are preferably substantially perpendicular to the outer surface of the tread in section at least over 30% $h_1$ of their depth H.

Figure 7:
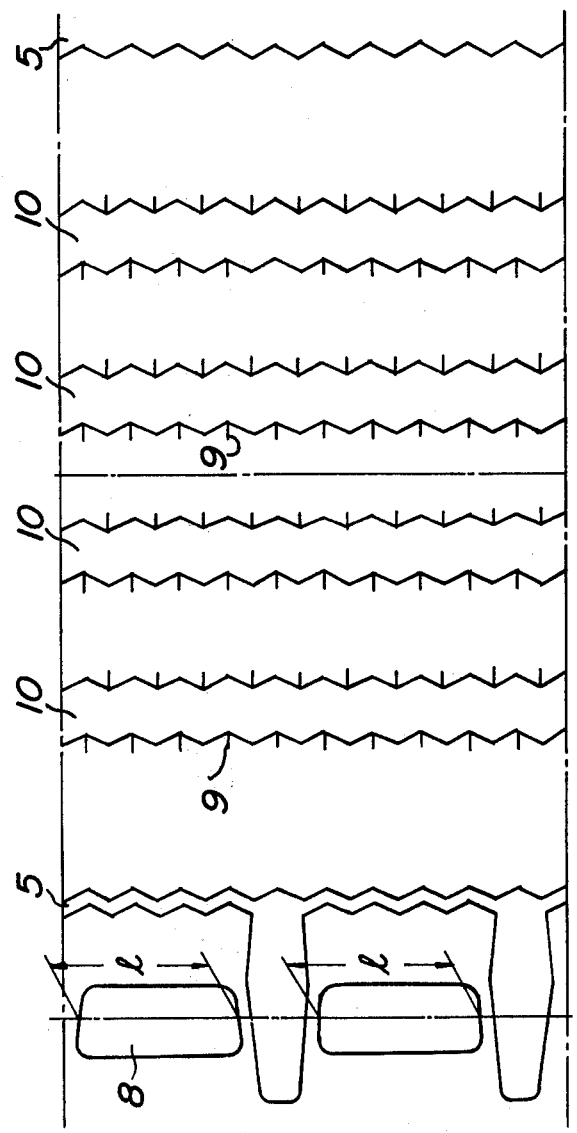
FIG. 7 is a developed view of the tread of the tire shown in FIG. 6.

The railway wear in the tread surface may be prevented by sipes 9 extending in the axial direction of the tire and formed in the annular protrusions of the circumferential ribs 3 adjacent to and communicating with the main tread grooves 10 as shown in FIG. 7. The width of the sipe 9 is preferably 0.3–1.0 mm and the length in the axial direction of the tire is preferably 75–150% of the amplitude Q of the main tread grooves. The sipes are preferably located in the angular protrusions of the ribs 3 at a circumferential interval coincident with the angular protrusions.

Referring back to FIG. 5 illustrating one preferred embodiment of the tire according to the invention, the tire is the same in size as those used in the experiments and formed in the center of the tread 1 with four main tread grooves 2 circumferentially continuous in zigzag, which have a width of 12.5 mm, an amplitude Q of 2 mm and a pitch of the zigzag of 10 mm. The tread is formed with a pair of narrow grooves 5 in symmetry which have a width of 3 mm, an amplitude 2 mm and a pitch of the zigzag 10 mm and a center distance of 180 mm substantially the same as the contact width $W_1$ with a road surface under a loaded condition (with the standard rim, the standard inner pressure and the standard full load). Experimental results of the tires are shown in Table 1 as tire A according to the invention.

This tire as shown in FIG. 5 is further formed with the caved portions 8 such that deepest bottoms Z thereof are 28 mm radially inside of the outer diameter of the tread center under a no-load condition and the distance $W_3$ between the deepest bottoms Z under the no-load condition is 170 mm which is 94% of the contact width $W_1$ with a road surface under a loaded condition as shown in FIGS. 6 and 7. The total circumferential length of a circumferential series of the caved portions 8 is about 95% of the circumferential of the tire. Experimental results of the tires are shown in Table 1 as tire B.

The results of the tires A and B are shown in Table 1 in comparison with tires of the prior art each of which is the same in size as the tires A and B has a contract width of 180 mm which is formed with four main tread grooves having a width of 9.6 mm, an amplitude of 5.0 mm and a pitch of zigzag of 25 mm.

Test conditions
  Vehicle: Large platform body truck
  Load: Constant loaded
  Inner pressure of tire: 7.25 kg/cm$^2$
  Road: Super-highway 70%,
    Usual road 30%
  Speed of vehicle: 80 km/hour on super-highway,
    40 km/hour on usual road
  Travelled distance: 35,000 km
  Tire position: Front wheels
    (Left and right tires are interchanged with each other every 5,000 km of travelling.)

Table 1

|  | Tires according to the invention | | Tire of |
|---|---|---|---|
|  | A | B | prior art |
| Railway wear at narrow grooves according to the invention or irregular wear at shoulders of tires of prior art | h" 0.8 mm w" 6.0 mm | h" 0.5 mm w" 3.0 mm | h 1.4 mm w 16 mm |
| Railway wear at main tread grooves | h' 0.3 mm w' 0.5 mm | h' 0.3 mm w' 0.5 mm | h' 1.2 mm w' 7.0 mm |

As can be seen from the results in Table 1, the tires according to the invention do not cause the irregular wear at the shoulders even if they have round shoulders and do reduce and prevent the railway wear and growth thereof toward the center of the tread, so that the wear-resistance of the tires is remarkably improved according to the invention.

It is understood by those skilled in the art that the foregoing description discloses preferred embodiments of the invention and that various changes and modifications may be made in the invention without departing from the spirit and scope thereof.

What is claimed is:

1. In a heavy duty pneumatic radial tire including a tread smoothly continuous at its round-shaped shoulders with sidewalls and formed in its substantially central circumferential surface with a plurality of main tread grooves extending circumferentially thereof, said tread being reinforced by a belt consisting of at least two metal cord layers arranged about carcass plies and between said tread and carcass plies, the improvement comprising, in an end zone of contact surfaces of said shoulders with a road surface under a standard load, a circumferentially extending narrow groove in a zigzag pattern having a width of 15–30% of that of said main tread grooves, an amplitude of said zigzag pattern of 0.5–2.0% of a tread width corresponding to a distance between ends of said contact surfaces and a pitch of said zigzag pattern of 2.0–7.0% of said tread width.

2. A tire as set forth in claim 1, wherein said narrow groove is so formed in each said shoulder that a distance between centers of said grooves is 90-105% of said tread width.

3. A tire as set forth in claim 1, wherein a depth of said narrow groove is at least 60% of that of said main tread groove.

4. In a heavy duty pneumatic radial tire including a tread smoothly continuous at its round-shaped shoulders with sidewalls and formed in its substantially central circumferential surface with a plurality of main tread grooves extending circumferentially thereof, said tread being reinforced by a belt consisting of at least two metal cord layers arranged about carcass plies and between said tread and carcass plies, the improvement comprising, in an end zone of a contact surface of each said shoulder with a road surface under a standard load, a circumferentially extending narrow groove in zigzag having a width of 15-30% of a width of said main tread grooves, an amplitude of said zigzag of 0.5-2.0% of a tread width corresponding to a distance between ends of said contact surfaces and a pitch of said zigzag of 2.0-7.0% of said tread width and further comprising a series of continuous or discontinuous caved portions circumferentially formed in a side surface of each said shoulder, a distance in an axial direction of the tire between the deepest bottoms of the caved portions being 105-110% of said tread width, and said deepest bottoms being located in a circle having a diameter less than that of a circle passing through bottoms of said main tread grooves.

5. A tire as set forth in claim 4, wherein said series of the caved portions are circumferentially continuous.

6. A tire as set forth in claim 4, wherein a total circumferential length of said intermittent caved portions along said deepest bottoms is at least 80% of a circumferential length thereat of the tire.

* * * * *